United States Patent
Borgerding

(10) Patent No.: US 6,951,084 B2
(45) Date of Patent: Oct. 4, 2005

(54) DRAFT SHIELD FOR A LOADING DOCK SHELTER

(75) Inventor: Gary Borgerding, Dubuque, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 10/292,788

(22) Filed: Nov. 12, 2002

(65) Prior Publication Data

US 2004/0020141 A1 Feb. 5, 2004

Related U.S. Application Data

(63) Continuation of application No. PCT/US02/24365, filed on Jul. 31, 2002.

(51) Int. Cl.[7] ............................................... E04H 14/00
(52) U.S. Cl. ....................................... 52/173.2; 49/504
(58) Field of Search .............................. 52/173.2, 2.12, 52/173.1; 49/475, 504, 405, 493.1

(56) References Cited

U.S. PATENT DOCUMENTS

| | | | |
|---|---|---|---|
| 3,403,489 A | * 10/1968 | Frommelt et al. | ......... 52/173.2 |
| 3,653,173 A | * 4/1972 | Frommelt et al. | ......... 52/173.2 |
| 3,699,733 A | * 10/1972 | Frommelt et al. | ............ 52/204 |
| 3,772,839 A | 11/1973 | Timbers | |
| 3,792,559 A | 2/1974 | Frommelt | |
| 4,062,157 A | 12/1977 | Potthoff | |
| 4,799,342 A | 1/1989 | Klevnjans | |
| 4,825,607 A | * 5/1989 | Frommelt et al. | ............ 52/173 |
| 4,885,881 A | 12/1989 | Lenz | |
| 6,014,844 A | 1/2000 | Thill | |

FOREIGN PATENT DOCUMENTS

EP 0186093 7/1986

OTHER PUBLICATIONS

International Search Report for PCT/US02/24365.

* cited by examiner

Primary Examiner—Naoko Slack
(74) Attorney, Agent, or Firm—Marshall, Gerstein & Borun LLP

(57) ABSTRACT

At a truck loading dock, a flexible draft shield helps seal a lower inner corner of a dock shelter. Instead of a foam core, the draft shield includes a resiliently flexible frame that supports a pliable cover. In some embodiments, the frame includes a spring steel loop that is able to flex upon being squeezed between two members of the dock shelter. In some cases, the draft shield is hollow and open at the bottom.

28 Claims, 4 Drawing Sheets

DRAFT SHIELD FOR A LOADING DOCK SHELTER

This application is a continuation of PCT/US02/24365 filed Jul. 31, 2002.

BACKGROUND OF THE INVENTION

1. Field of the Invention

The subject invention generally pertains to loading dock shelters, and more specifically to a device that helps seal a lower corner of the dock shelter.

2. Description of Related Art

When an exterior doorway of a building is used for loading and unloading trucks, the doorway often includes a dock shelter to help shield against weather. The dock shelter seals off gaps that might otherwise exist between the exterior face of the building and the back end of the truck. Dock shelters often have projecting members that protrude outwardly from the face of the building and run generally along the top and lateral sides of the doorway. From a protruding edge of the projecting members, a top extending member and two laterally extending members may extend inward and generally parallel to the building face to help seal against the truck's top and sides, respectively. The laterally extending members can be made of fabric, hinged panels, or flexible foam. Portions of the truck's rear bottom edge are often partially sealed off by dock bumpers and the lip extension of a dock leveler. The remaining gaps are two inner bottom corners of the dock shelter at the lower back sides of the truck. These gaps are often partially sealed by draft pads attached to the lower ends of the projecting members.

Examples of draft pads can be found in U.S. Pat. Nos. 4,885,881; 3,792,559 and 6,014,844. In these examples, the draft pads comprise a compressible foam core covered with pliable fabric. The foam core enables the pad to be compressed by a truck backing into the dock shelter and provides the pad with compliance for filling certain air gaps within the shelter. The fabric cover helps protect the foam core from dirt, wear and weather.

To help prevent the draft pad from sagging, the foam core includes a certain amount of bulk for structural support. Except for the added expense, such bulk may not be a problem with today's conventional dock shelters. However, newer dock shelters may be best served by a draft seal having a sleeker, more lightweight design.

SUMMARY OF THE INVENTION

In some embodiments, a draft shield for a dock shelter includes a resilient frame with a pliable fabric cover.

In some embodiments, the frame of a draft shield is made of spring steel.

In some embodiments, the frame of a draft shield forms a loop.

In some embodiments, a draft shield is hollow.

In some embodiments, a draft shield includes an open bottom.

In some embodiments, the cover of a draft shield includes a pocket or hem that holds the frame of the seal.

In some embodiments, a draft shield has an overall height that is less than its horizontal span.

DESCRIPTION OF THE PREFERRED EMBODIMENT

Figure 1:
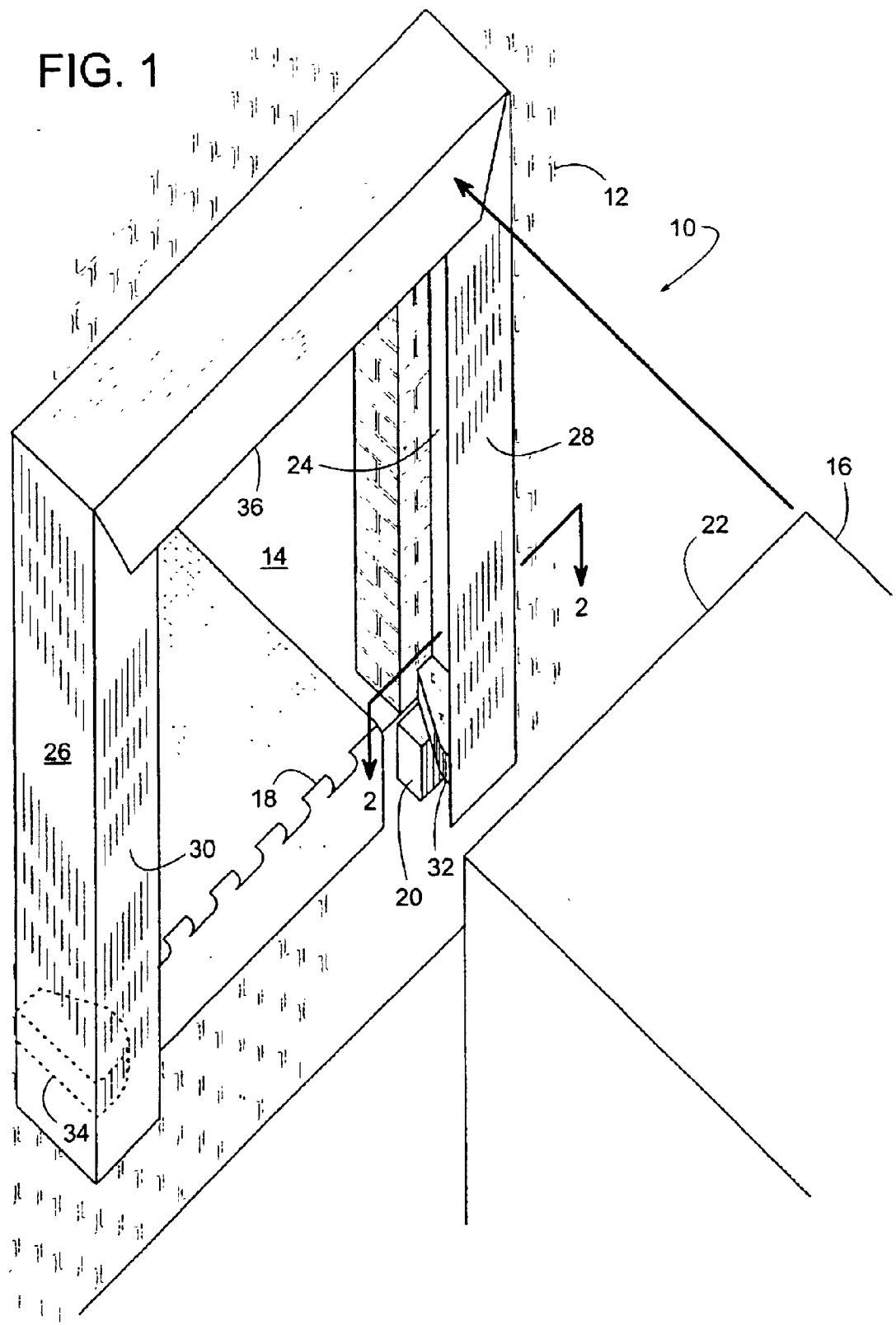
FIG. 1 is a perspective view of a truck backing into a dock shelter that includes a draft shield, wherein the dock shelter is in a standby position.

FIG. 1 shows a dock shelter 10 attached to an exterior face of a building 12. Building 12 includes a doorway 14 through which a vehicle 16, such as a truck or trailer, may load and unload its cargo. Building 12 may also optionally include a dock leveler 18 and bumpers 20. Dock shelter 10 is situated generally along lateral edges of doorway 14 to help seal gaps that may otherwise exist between the exterior face of building 12 and a back end 22 of vehicle 16.

Figure 2:
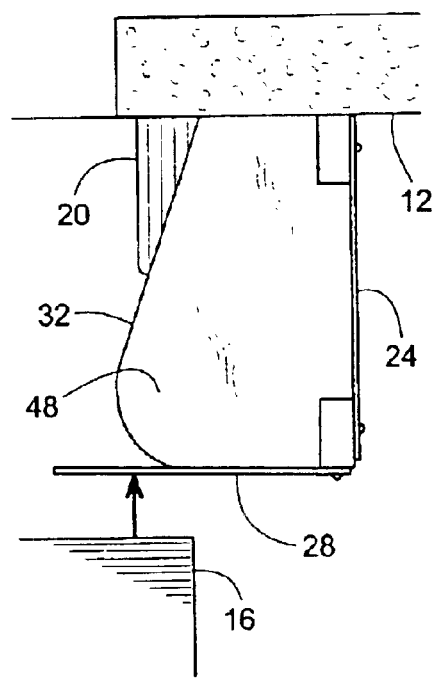
FIG. 2 is a cross-sectional view taken along line 2—2 of FIG. 1.
Figure 3:
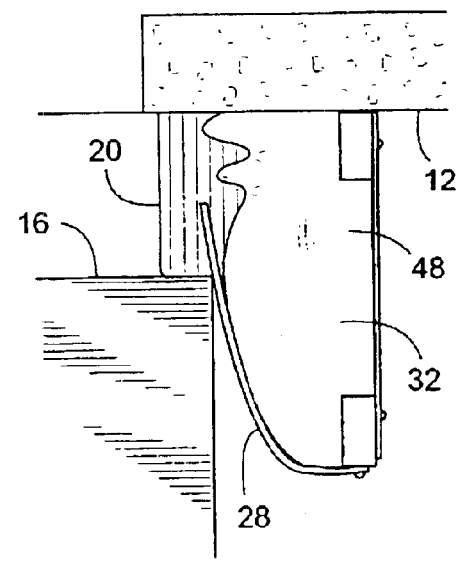
FIG. 3 is similar to FIG. 2, but with the vehicle having forced the dock shelter into a vehicle-engaging position.

Dock shelter 10 has a right projecting member 24 and a left projecting member 26 that extend outward from building 12. Both projecting members 24 and 26 have respective laterally extending members 28 and 30 that extend generally inward toward vehicle 16. As vehicle 16 backs into dock shelter 10, laterally extending members 28 and 30 can pivot from a standby position of FIGS. 1 and 2 to a vehicle-engaging position of FIG. 3. The term, "pivot" broadly refers to one member rotating or moving relative to another, wherein the rotation is made possible by any means including, but not limited to, a hinge or by way of deflection.

When vehicle 16 moves members 28 and 30 to the vehicle-engaging position, a draft shield 32 is deflected or compressed in a lower inside corner between projecting member 24 and laterally extending member 28 to help obstruct airflow in that area. Likewise, another draft shield 34, which is a left-hand version of draft shield 32, is installed at the lower inside corner of projecting member 26 and laterally extending member 30.

Projecting members 24 and 26 and laterally extending members 28 and 30 represent a myriad of structural possibilities. Some examples of projecting members 24 include, but are not limited to, the projecting members being made of foam (compressible and resilient), wood, fabric, steel, and various combinations thereof. The same is true for laterally extending members 28 and 30. More specific examples of projecting members and their laterally extending members include, but are not limited to, an L-PAD made of a compressible, resilient foam where the projecting members can each be integrally joined as a unitary piece to their respective laterally extending members; a model WG-402 dock shelter having wood-framed projecting members with laterally extending members made of fabric; and ELIMINATOR having foam projecting members with laterally extending members made of fabric; and a dock shelter whose projecting members are normally rigid but are able to collapse without extensive permanent damage upon impact of a truck. The L-PAD, WG-402, and ELIMINATOR are products of Frommelt Products Corporation, of Milwaukee, Wis. Typical dock shelters also include a header 36 that may be similar in structure and function as the projecting and laterally extending members just described; however, header 36 is for sealing along an upper rear edge of vehicle 16. Based on the foregoing, one of skill in the art will appreciate that the term "dock shelter" as used herein may encompass traditional dock shelters, certain dock seals, and "hybrid" products such as the ELIMINATOR.

Figure 4:
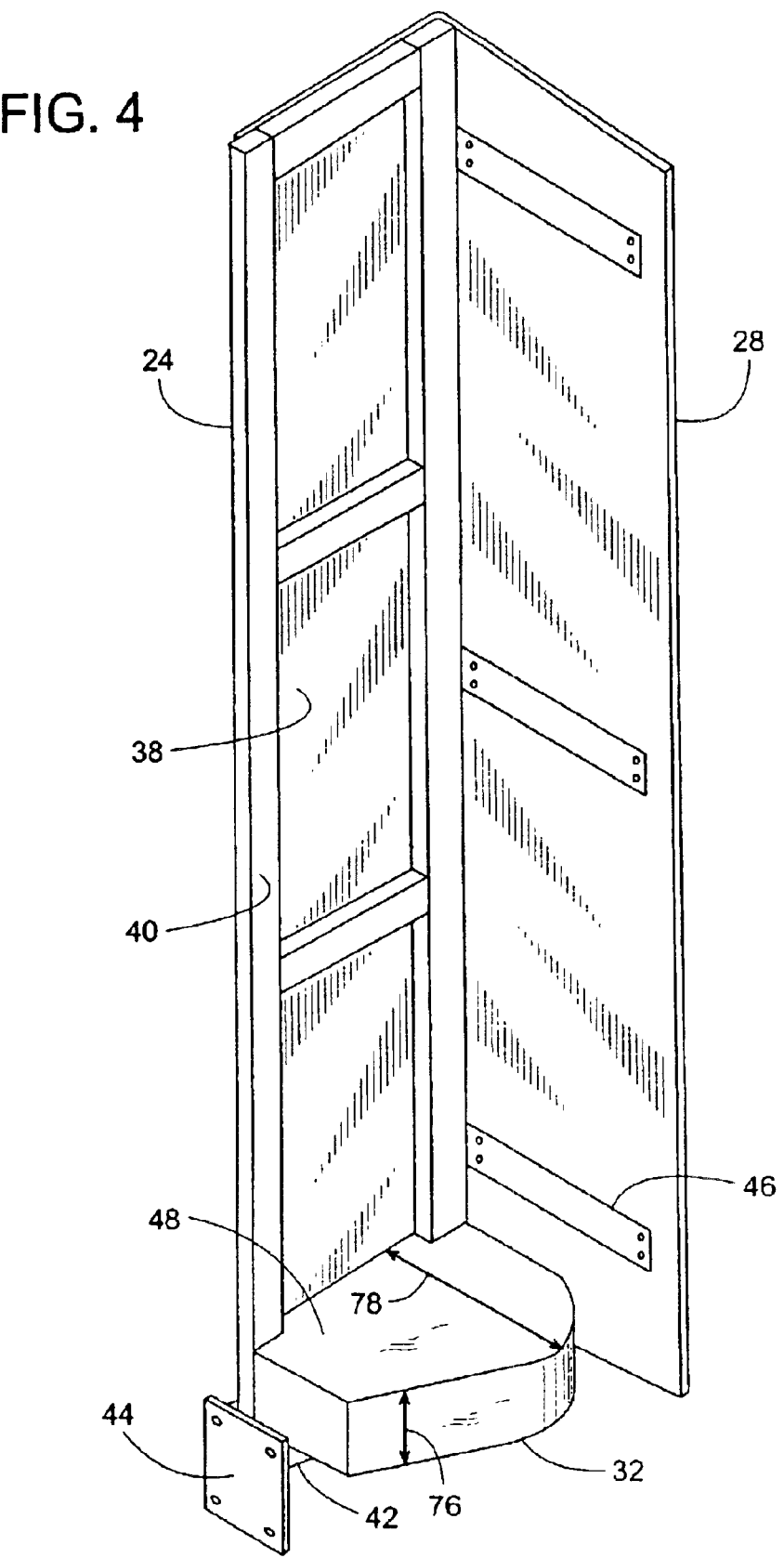
FIG. 4 is a perspective view of one part of a dock shelter and its draft shield.

Referring to FIG. 4, in some embodiments, projecting member 24 comprises a semi-rigid plastic panel 38 attached to a frame 40 made of standard two-by-fours (lumber having a nominal cross-section of 2-inches by 4-inches). Frame 40 can be supported by a beam 42 that includes a flange 44 for attaching beam 42 to the face of building 12. Laterally extending member 28 can also be made of semi-rigid plastic with one vertical edge fastened to frame 40. In some embodiments, panel 38 and member 28 are made of ⅛-inch thick high molecular weight polyethylene. Although other materials and thickness can be used, laterally extending member 28 preferably has sufficient flexibility to resiliently pivot or deflect relative to projecting member 24, or a hinge connecting members 24 and 28 may be used. In some cases, adding spring steel strips 46 can increase the stiffness and/or resilience of laterally extending member 28.

Figure 5:
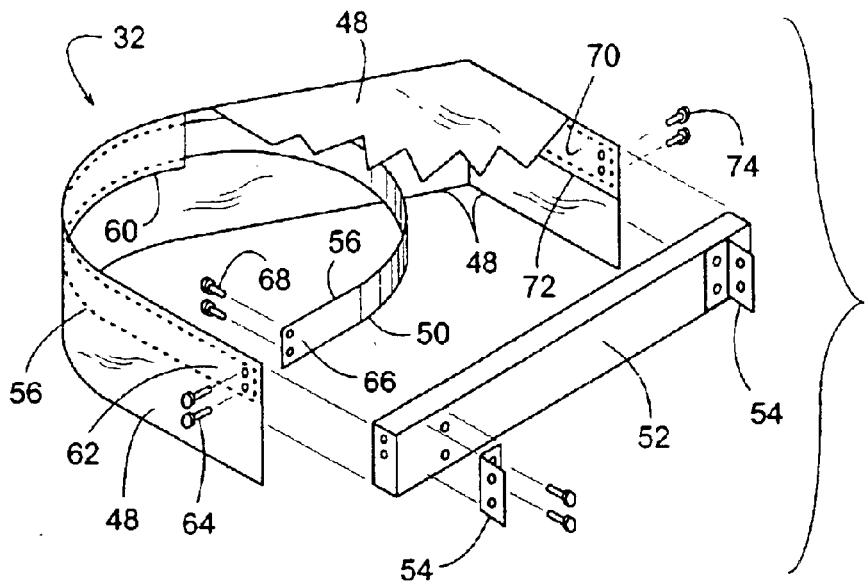
FIG. 5 is an exploded view of the draft shield of FIGS. 1–4 and with part of the cover cut away.
Figure 6:
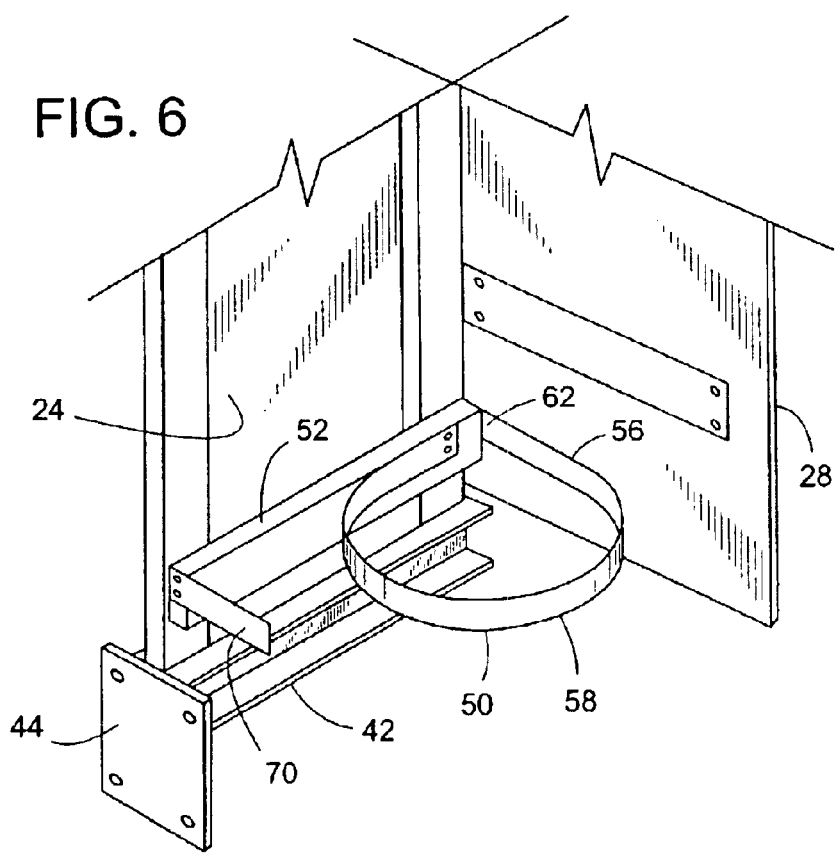
FIG. 6 is a perspective view of the draft shield of FIGS. 1–5, but with the cover omitted to show other details.

The construction of draft shield 32 can be as shown in FIGS. 5 and 6. FIG. 5 shows an exploded view of draft shield 32 with some portions cut-away to show detail underneath. FIG. 6 shows draft shield 32 with a pliable cover 48 removed to show more clearly a resilient frame 50 that supports cover 48. A two-by-four backer 52 allows draft shield 32 to be mounted to projecting member 24 by way of brackets 54 or by some other appropriate mounting hardware. Frame 50 includes a resilient strap 56 made of a flexible solid material, such as spring steel. The term, "solid material" refers to a material that is non-cellular and to a member whose base substance is impervious to liquid water. For example, a perforated strap made of spring steel may allow liquid water to pass through any perforations, yet the base substance itself, steel, is impervious to liquid water. Strap 56 can be formed in a loop 58 by inserting strap 56 through a first hem 60 in cover 48, attaching one end 62 of strap 56 to backer 52 via fasteners 64, and attaching an opposite end 66 of strap 56 to backer 52 via fasteners 68. Another strap 70 inserted into a second hem 72 and attached to backer 52 via fasteners 74 can be used to help support a rear portion of cover 48. Cover 48 overlays strap 56, strap 70 and backer 52 to obstruct airflow or drafts at the lower inside corner of projecting member 24 and laterally extending member 28. Cover 48 can be made of pliable vinyl or some other pliable material or fabric.

Figure 7:
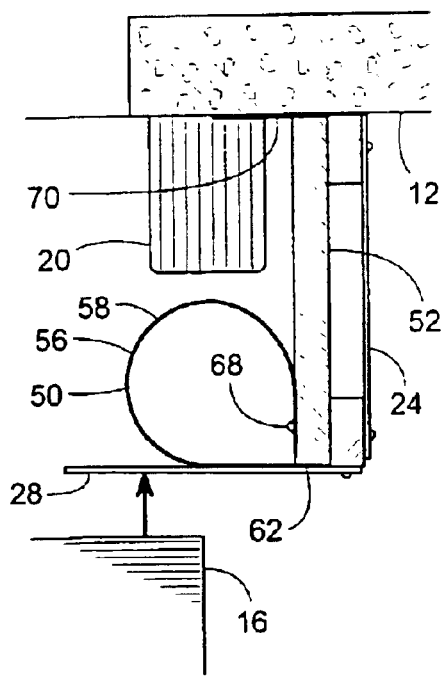
FIG. 7 is similar to FIG. 2, but with the cover omitted to show the draft shield in an extended position.
Figure 8:
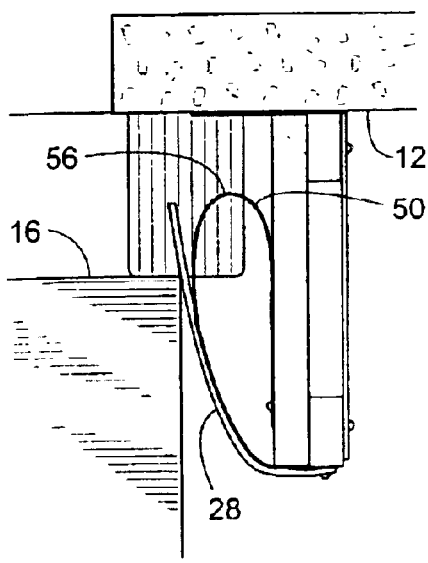
FIG. 8 is similar to FIG. 3, but with the cover omitted to show the draft shield in a collapsed position.

The function of draft seal 32 can be further understood with reference to FIGS. 2, 3, 7 and 8. FIGS. 7 and 8 are the same as FIGS. 2 and 3 respectively, but with cover 48 omitted to show how frame 50 flexes. As vehicle 16 backs into dock shelter 10, vehicle 16 forces laterally extending member 28 to move from its standby position of FIGS. 2 and 7 to its vehicle-engaging position of FIGS. 3 and 8. As this occurs, vehicle 16 also forces laterally extending member 28 to resilient bend frame 50 from an extended position of FIG. 7 to a collapsed position of FIG. 8. The pliability of cover 48 allows cover 48 to follow the movement of frame 50 to shield against upward or downward drafts at the lower inside corner of projecting member 24 and laterally extending member 28. Shielding against such drafts can be most effective when cover 48 can further seal or brush against the top of bumper 20.

Draft shield 32 is preferably hollow and open at the bottom to allow shield 32 to exhaust and take-in air upon moving to the collapsed and extended positions respectively.

Referring to FIG. 4, to minimize weight and size, draft shield 32 has a height 76 that is appreciably less than its horizontal span 78, wherein the span is measured in a direction perpendicular to projecting member 24 and parallel to the face of building 12.

Although the invention is described with respect to a preferred embodiment, modifications thereto will be apparent to those skilled in the art. Therefore, the scope of the invention is to be determined by reference to the claims, which follow.

What is claimed is:

1. A hollow draft shield for a dock shelter, wherein the dock shelter is movable between a standby position disengaged from a vehicle and a vehicle-engaging position, the draft shield comprising:

a frame being resiliently movable between an extended position and a collapsed position, wherein the frame is movable to the extended position when the dock shelter is in the standby position and the frame is movable to the collapsed position when the dock shelter is in the vehicle-engaging position; and a pliable cover overlaying the frame and adapted to remain engaged with the dock shelter as the dock shelter moves between the standby position and the vehicle-engaging position, wherein the draft shield has an open bottom.

2. The draft shield of claim 1, wherein the frame includes a resilient band.

3. The draft shield of claim 1, wherein the frame comprises a solid material that is steel.

4. The draft shield of claim 1, wherein the frame includes a spring-biased resilient loop that helps support the pliable cover.

5. The draft shield of claim 1, wherein the pliable cover includes a first hem through which the frame extends.

6. The draft shield of claim 5, wherein the pliable cover includes a second hem through which the frame extends.

7. The draft shield of claim 1, wherein the draft shield has a horizontal span and a vertical height, with the horizontal span being greater than the vertical height.

8. A dock shelter for use at a loading dock that facilitates the loading or unloading of a vehicle at a building, the dock shelter comprising:

a projecting member attachable to the building;

a laterally extending member movably connected to the projecting member and being adapted to be engaged by the vehicle, wherein the laterally extending member is movable from a standby position to a vehicle-engaging position in response to the vehicle backing into the laterally extending member; and a hollow draft shield disposed at a lower end of the projecting member and extending to the laterally extending member to obstruct airflow therebetween, wherein the hollow draft shield has an open bottom.

9. The dock shelter of claim 8, wherein the hollow draft shield includes a pliable cover overlaying a resilient frame.

10. The dock shelter of claim 9, wherein the resilient frame includes a resilient band.

11. The dock shelter of claim 9, wherein the resilient frame is comprised of steel.

12. The dock shelter of claim 9, wherein the resilient frame includes a spring-biased resilient loop that helps support the pliable cover.

13. The dock shelter of claim 9, wherein the pliable cover includes a first hem through which the resilient frame extends.

14. The dock shelter of claim 13, wherein the pliable cover includes a second hem through which the resilient frame extends.

15. The dock shelter of claim 8, wherein the hollow draft shield has a horizontal span and a vertical height, with the horizontal span being greater than the vertical height.

16. A dock shelter for use at a loading dock that facilitates the loading or unloading of a vehicle at a building, the dock shelter comprising:

a projecting member attachable to the building;

a laterally extending member movably connected to the projecting member and being adapted to be engaged by the vehicle, wherein the laterally extending member is movable from a standby position to a vehicle-engaging position in response to the vehicle backing into the laterally extending member;

a frame disposed at a lower end of the projecting member and extending to the laterally extending member, wherein the frame is resiliently movable between an extended position when the laterally extending member is in the standby position and a collapsed position when the laterally extending member is in the vehicle-engaging position; and a pliable cover overlaying the frame to provide an obstruction to vertical airflow between the projecting member and the laterally extending member, wherein the frame and the pliable cover comprise a draft shield that is hollow, wherein the draft shield has an open bottom.

17. The dock shelter of claim 16, wherein the frame includes a resilient strap.

18. The dock shelter of claim 16, wherein the frame comprises a solid material that is steel.

19. The dock shelter of claim 16, wherein the frame includes a resilient loop that helps support the pliable cover.

20. The dock shelter of claim 16, wherein the pliable cover includes a first hem through which the frame extends.

21. The dock shelter of claim 20, wherein the pliable cover includes a second hem through which the frame extends.

22. The dock shelter of claim 16, wherein the draft shield has a horizontal span and a vertical height, with the horizontal span being greater than the vertical height.

23. A dock shelter for use at a loading dock that facilitates the loading or unloading of a vehicle at a building, the dock shelter comprising:

a projecting member attachable to the building;

a laterally extending member movably connected to the projecting member and being adapted to be engaged by the vehicle, wherein the laterally extending member is movable from a standby position to a vehicle-engaging position in response to the vehicle backing into the laterally extending member;

a frame disposed at a lower end of the projecting member, wherein the frame is resiliently movable between an extended position when the laterally extending member is in the standby position and a collapsed position when the laterally extending member is in the vehicle-engaging position; and a pliable cover overlaying the frame, whereby the frame and the pliable cover comprises a draft shield having a span and a height, wherein the span extends between the projecting member and the laterally extending member, and the height is perpendicular to and less than the span, wherein the frame and the pliable cover comprise a draft shield that is hollow, wherein the draft shield has an open bottom.

24. The dock shelter of claim 23, wherein the frame includes a resilient strap.

25. The dock shelter of claim 23, wherein the frame is comprised of steel.

26. The dock shelter of claim 23, wherein the frame includes a resilient loop that helps support the pliable cover.

27. The dock shelter of claim 23, wherein the pliable cover includes a first hem through which the frame extends.

28. The dock shelter of claim 27, wherein the pliable cover includes a second hem through which the frame extends.

* * * * *